(12) United States Patent
Cai et al.

(10) Patent No.: US 11,600,992 B2
(45) Date of Patent: Mar. 7, 2023

(54) ELECTRIC PROTECTION CIRCUIT

(71) Applicant: Contemporary Amperex Technology Co., Limited, Ningde (CN)

(72) Inventors: Jinbo Cai, Ningde (CN); Zhimin Dan, Ningde (CN); Wei Zhang, Ningde (CN); Yizhen Hou, Ningde (CN); Xiong Zheng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 270 days.

(21) Appl. No.: 16/966,220

(22) PCT Filed: Dec. 6, 2019

(86) PCT No.: PCT/CN2019/123722
§ 371 (c)(1),
(2) Date: Jul. 30, 2020

(87) PCT Pub. No.: WO2020/114501
PCT Pub. Date: Jun. 11, 2020

(65) Prior Publication Data
US 2021/0050719 A1 Feb. 18, 2021

(30) Foreign Application Priority Data
Dec. 6, 2018 (CN) .......................... 201811488440.0

(51) Int. Cl.
*H02H 7/00* (2006.01)
*H02H 7/20* (2006.01)
(Continued)

(52) U.S. Cl.
CPC ................ *H02H 7/20* (2013.01); *H02H 7/00* (2013.01); *H02H 7/18* (2013.01); *H02H 7/222* (2013.01); *H02J 7/0031* (2013.01)

(58) Field of Classification Search
CPC .. H02H 7/18; H02H 7/00; H02H 7/20; H02H 7/222; H02H 7/0031; H02M 1/344
See application file for complete search history.

(56) References Cited

U.S. PATENT DOCUMENTS 3,389,318 A * 6/1968 Hoyt, Jr. ................... H02P 7/29
327/473
5,142,433 A * 8/1992 Nishibe ................ H02H 11/002
361/111
(Continued)

FOREIGN PATENT DOCUMENTS

CN          101047072 A  * 10/2007
CN          101073990 A  * 11/2007
(Continued)

OTHER PUBLICATIONS

The First Examination Report for Europe Application No. 19894124.7, dated Oct. 22, 2021, 7 pages.
(Continued)

*Primary Examiner* — Naum Levin
(74) *Attorney, Agent, or Firm* — East IP P.C.

(57) ABSTRACT

The present application provides an electric protection circuit, which relates to the field of battery power. The electric protection circuit includes a battery pack, a main positive switch, a load device and a main negative switch connected in series. The main positive switch and/or the main negative switch include at least one semiconductor switch. The main positive switch and/or the main negative switch in the electric protection circuit are connected in parallel to a protection module, which absorbs electric energy across two terminals of the main positive switch and/or the main negative switch when the main positive switch and/or the main negative switch are turned off. The technical solution of the present application can improve the safety of the electric protection circuit.

19 Claims, 3 Drawing Sheets

(51) Int. Cl.
*H02H 7/18* (2006.01)
*H02J 7/00* (2006.01)
*H02H 7/22* (2006.01)

(56) References Cited

U.S. PATENT DOCUMENTS

| | | | | |
|---|---|---|---|---|
| 8,314,589 | B2 * | 11/2012 | Hur | H02J 7/0031 |
| | | | | 429/96 |
| 9,035,618 | B2 * | 5/2015 | Lee | H02J 7/0031 |
| | | | | 320/136 |
| 10,404,189 | B2 * | 9/2019 | Ishibashi | H03K 17/162 |
| 11,223,195 | B2 * | 1/2022 | Lee | B62D 5/0481 |
| 2002/0141124 | A1 * | 10/2002 | Ito | H02H 11/003 |
| | | | | 361/84 |
| 2006/0072259 | A1 | 4/2006 | Yunus | |
| 2009/0108806 | A1 | 4/2009 | Takano et al. | |
| 2015/0061382 | A1 | 3/2015 | Roessler | |
| 2020/0235591 | A1 * | 7/2020 | Kawasaki | H03K 17/0822 |
| 2021/0104903 | A1 * | 4/2021 | Zhang | H02J 7/00304 |

FOREIGN PATENT DOCUMENTS

| | | | | |
|---|---|---|---|---|
| CN | 101867298 | A | | 10/2010 |
| CN | 102931849 | A | | 2/2013 |
| CN | 103326328 | A | | 9/2013 |
| CN | 203193261 | U | * | 9/2013 |
| CN | 204089775 | U | * | 1/2015 |
| CN | 104584370 | A | * | 4/2015 ........... B60L 11/1853 |
| CN | 104868517 | A | | 8/2015 |
| CN | 204720969 | U | | 10/2015 |
| CN | 105490255 | A | * | 4/2016 |
| CN | 205622497 | U | * | 10/2016 |
| CN | 104302080 | B | * | 1/2017 |
| CN | 205875982 | U | * | 1/2017 |
| CN | 106486978 | A | * | 3/2017 |
| CN | 206004524 | U | | 3/2017 |
| CN | 206237303 | U | * | 6/2017 |
| CN | 104808536 | B | * | 9/2017 ............. B60R 16/03 |
| CN | 206727694 | U | | 12/2017 |
| CN | 107791844 | A | | 3/2018 |
| CN | 108288850 | A | * | 7/2018 ............... H02H 3/08 |
| CN | 108347172 | A | * | 7/2018 |
| CN | 108705943 | A | | 10/2018 |
| CN | 108879027 | A | | 11/2018 |
| CN | 108923521 | A | * | 11/2018 ............ H02J 7/0031 |
| CN | 108923678 | A | * | 11/2018 |
| CN | 109130859 | A | * | 1/2019 |
| CN | 109256752 | A | * | 1/2019 ............... H02H 7/18 |
| CN | 208424213 | U | * | 1/2019 |
| CN | 109391009 | A | * | 2/2019 |
| CN | 107069672 | B | * | 3/2019 ............. H02H 3/042 |
| CN | 110473742 | A | * | 11/2019 ........... H01H 47/002 |
| CN | 110970961 | A | * | 4/2020 ............... H02H 7/18 |
| CN | 111064172 | A | * | 4/2020 |
| CN | 110473742 | B | * | 7/2021 ........... H01H 47/002 |
| JP | 10315849 | A | * | 12/1998 |
| JP | H11206136 | A | * | 7/1999 |
| JP | 2000184776 | A | * | 6/2000 |
| JP | 2005149092 | A | * | 6/2005 |
| JP | 3724176 | B2 | * | 12/2005 |
| JP | 4061335 | B2 | * | 3/2008 .............. B60L 58/20 |
| JP | 2016101037 | A | * | 5/2016 |
| TW | 301081 | B | | 3/1997 |
| WO | WO-2007083008 | A2 | * | 7/2007 ......... H03K 17/0822 |
| WO | WO-2017061396 | A1 | * | 4/2017 |

OTHER PUBLICATIONS

The Second Office Action for China Application No. 201811488440.0, dated Oct. 21, 2020, 9 pages.

The Third Office Action for China Application No. 201811488440.0, dated Jan. 27, 2021, 4 pages.

The First Office Action for China Application No. 201811488440.0, dated Dec. 6, 2018, 13 pages.

The International search report for PCT Application No. PCT/CN2019/123722, dated Feb. 28, 2020, 10 pages.

The extended European search report for EP Application No. 19894124.7, dated Mar. 10, 2021, 8 pages.

* cited by examiner

ELECTRIC PROTECTION CIRCUIT

CROSS-REFERENCE TO RELATED APPLICATIONS

This application is a National Stage of International Application No. PCT/CN2019/123722, filed on Dec. 6, 2019, which claims priority to Chinese Patent Application No. 201811488440.0, filed on Dec. 6, 2018, both of which are hereby incorporated by reference in their entireties.

TECHNICAL FIELD

The present application relates to the field of battery power, in particular to an electric protection circuit.

BACKGROUND

With the rapid development of new energy, more and more types of equipment can be powered by new energy. For example, battery modules, battery packs and the like can be used as power sources to provide power to new energy vehicles, new energy ships, new energy aircraft and so on.

There are electric circuits in new energy vehicles, new energy ships, new energy aircraft and other equipment, and battery modules, battery packs and the like supply power to electric loads through electric circuits. In the specific implementation process, a switch is arranged in the electric circuit to control the conduction of the electric circuit. There is various equivalent capacitance and equivalent inductance in the electric circuit. When the switch is turned off, the potential at both terminals of the switch will be adversely affected by the equivalent capacitors, the equivalent inductors, and the abnormal conditions that may happen to the electric load. For example, when the switch is turned off, an electrical breakdown may happen to the switch. The safety of the electric circuit is reduced.

SUMMARY

The embodiments of the present application provide an electric protection circuit, which can improve the safety of the electric protection circuit.

The embodiments of the present application provide an electric protection circuit, where the electric protection circuit includes a battery pack, a main positive switch, a load device and a main negative switch connected in series, and the main positive switch and/or the main negative switch include at least one semiconductor switch; the main positive switch and/or the main negative switch in the electric protection circuit are connected in parallel to a protection module, and the protection module is configured to absorb electric energy across two terminals of the main positive switch and/or the main negative switch when the main positive switch and/or the main negative switch are turned off.

In the electric protection circuit of the embodiments of the present application, the protection module is provided, which is connected in parallel to the main positive switch and/or the main negative switch. The protection module can absorb the electric energy across the two terminals of the main positive switch and/or the main negative switch when the main positive switch and/or the main negative switch are turned off, which avoids that: when the main positive switch and/or the main negative switch are turned off, abnormalities of the other parts of the electric circuit cause the voltage across the two terminals of the main positive switch and/or the main negative switch to increase and a peak voltage is generated, thus leading to the breakdown of the main positive switch and/or the main negative switch or other circuit damage. Therefore, the safety of the electric protection circuit is improved.

BRIEF DESCRIPTION OF THE DRAWINGS

The present application can be better understood from the following description of specific embodiments of the present application with reference to the accompanying drawings, in which same or similar reference numbers represent same or similar features.

DESCRIPTION OF EXAMPLE CONFIGURATIONS

The features and exemplary embodiments of various aspects of the present application will be described in detail below. In the following detailed description, numerous specific details are set forth in order to provide a thorough understanding of the present application. However, it is obvious to those skilled in the art that the present application can be implemented without some of these specific details. The following description of the embodiments is merely for providing a better understanding of the present application by illustrating examples of the present application. The present application is by no means limited to any specific configuration and algorithm proposed below, but covers any modification, replacement, and improvement of the elements, components, and algorithms without departing from the spirit of the present application. In the accompanying drawings and the following description, well-known structures and techniques are not shown in order to avoid unnecessarily obscuring the present application.

The embodiments of the present application provide an electric protection circuit, which can be applied in a scenario of electric energy of a battery pack being used to supply power to a load device. The battery pack includes at least one battery module or at least one battery unit, which will not be limited herein. The battery pack can be used in an electric vehicle as a power source for the electric vehicle. The load device may be an electric device in the electric vehicle, such as a motor, an on-board air conditioner, an on-board player, and the like.

Figure 1:
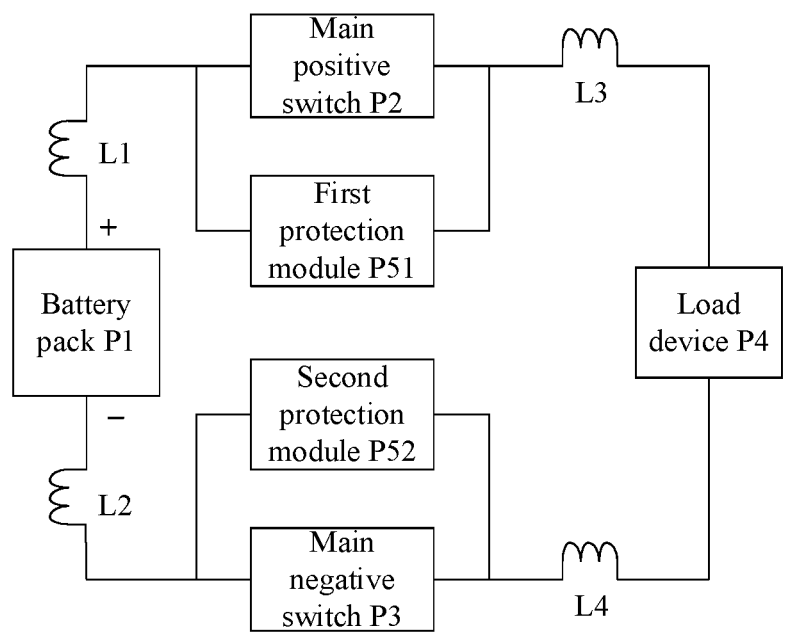
FIG. 1 is a structural diagram of an electric protection circuit according to an embodiment of the present application.

FIG. 1 is a structural diagram of an electric protection circuit according to an embodiment of the present application. As shown in FIG. 1, the electric protection circuit includes a battery pack P1, a main positive switch P2, a load device P4 and a main negative switch P3 connected in series.

The main positive switch P2 is connected to a positive electrode of the battery pack P1. The main negative switch P3 is connected to a negative electrode of the battery pack P1. The load device P4 is a collection of electric appliances, where the number of the electric appliances may be one or more, which will not be limited herein. For ease of illustration, in the embodiment of the present application, all the electric appliances are equivalent to the one load device P4. The load device P4, in the embodiment of the present application, is equivalent to a load capacitor for ease of illustration.

In one example, as shown in FIG. 1, the positive electrode of the battery pack P1 is connected to a first terminal of the main positive switch P2. A second terminal of the main positive switch P2 is connected to one terminal of the load device P4. The other terminal of the load device P4 is connected to a first terminal of the main negative switch P3. A second terminal of the main negative switch P3 is connected to the negative terminal of the battery pack P1.

In the embodiment of the present application, parasitic inductors existing in the electric protection circuit are taken as an example for illustration. There is a parasitic inductor between the positive electrode of the battery pack P1 and the main positive switch P2. There is a parasitic inductor between the main positive switch P2 and the load device P4. There is a parasitic inductor between load device P4 and main negative switch P3. There is a parasitic inductor between the main negative switch P3 and the battery pack P1. When the main positive switch P2 is changed from being turned on to being turned off, the parasitic inductor at the two terminals of the main positive switch P2 will generate induced electromotive force, which will increase a voltage across the two sides of the main positive switch P2, and a peak voltage is formed. Also, according to the characteristics of inductive current and inductive voltage, the higher a switching frequency of the main positive switch P2 is, the greater a current passing through the main positive switch P2 is (when the main positive switch P2 is turned on), and the greater the induced electromotive force generated at the two terminals of the main positive switch P2 is. Similarly, induced electromotive force will be generated by the two terminals of the main negative switch P3 when the main negative switch P3 is turned off. For ease of understanding, the equivalent parasitic inductors L1, L2, L3 and L4 are shown in FIG. 1.

The main positive switch P2 and/or the main negative switch P3 include at least one semiconductor switch. For example, the main positive switch P2 and the main negative switch P3 are both semiconductor switches. For another example, the main positive switch P2 is a relay, and the main negative switch P3 is a semiconductor switch. For yet another example, the main positive switch P2 is a semiconductor switch, and the main negative switch P3 is a relay.

In some examples, the semiconductor switch may include a metal-oxide-semiconductor field-effect transistor (MOSFET) or an insulated gate bipolar transistor (IGBT). It should be noted that the MOSFET has a gate electrode, a source electrode and a drain electrode. There is a parasitic diode between the source electrode and drain electrode of the MOSEFT, that is, there is a diode whose conduction direction is from the source electrode to the drain electrode. The IGBT may also be provided with a diode whose conduction direction is from the source electrode to the drain electrode. Also, the IGBT may not be provided with any diode, which will not be limited herein.

The main positive switch P2 and/or the main negative switch P3 in the electric protection circuit are connected in parallel to a protection module. Specifically, in some examples, a protection module connected in parallel to the main positive switch P2 may be provided for the main positive switch P2, a protection module connected in parallel to the main negative switch P3 may be provided for the main negative switch P3, and protection modules connected in parallel to the main positive switch P2 and the main negative switch P3 respectively may be provided at the same time. The protection module is configured to absorb the electric energy across both terminals of the main positive switch P2 and/or the main negative switch P3 when the main positive switch P2 and/or the main negative switch P3 are turned off.

It should be noted that the protection modules connected in parallel to the main positive switch P2 and the main negative switch P3 respectively may be modules of different structures composed of different elements, or modules of a same structure composed of the same device, which will not be limited herein. For example, the main positive switch P2 is connected in parallel to a first protection module p51, and the main negative switch P3 is connected in parallel to a second protection module P52.

In practical operation, when the main positive switch P2 and/or the main negative switch P3 are turned off, various equivalent capacitance (such as parasitic capacitance), equivalent inductance (parasitic inductance) and potential abnormal states of the electric load in the electrical protection circuit may cause adverse effects on the main positive switch P2 and/or the main negative switch P3, or the entire electrical protection circuit, which causes the voltage across the two terminals of the main positive switch P2 and/or the main negative switch P3 to increase. The protection module can absorb the electric energy across the two terminals of the main positive switch P2 and/or the main negative switch P3, thereby reducing and stabilizing the voltage across the two terminals of the main positive switch P2 and/or the main negative switch P3.

For example, it is assumed that the main positive switch P2 and the main negative switch P3 in FIG. 1 are both semiconductor switches. As shown in FIG. 1, the protection modules include the first protection module p51 and the second protection module P52. The main positive switch P2 is connected in parallel to the first protection module p51, and the main negative switch P3 is connected in parallel to the second protection module P52.

In the electric protection circuit according to the embodiment of the present application, the protection module is provided, which is connected in parallel to the main positive switch P2 and/or the main negative switch P3. When the main positive switch P2 and/or the main negative switch P3 are turned off, the protection module can absorb the electric energy across the two terminals of the main positive switch P2 and/or the main negative switch P3, which avoids that: when the main positive switch P2 and/or the main negative switch P3 are turned off, abnormalities of the other parts of the electric circuit cause the voltage across the two terminals of the main positive switch P2 and/or the main negative switch P3 to increase and a peak voltage is generated, thus leading to the breakdown of the main positive switch P2 and/or the main negative switch P3 or other circuit damage. Therefore, the safety of the electric protection circuit is improved. Moreover, since the protection module absorbs the electric energy across the two terminals of the main positive switch P2 and/or the main negative switch P3, the switching frequency of the main positive switch P2 and/or the main negative switch P3 is no longer limited by the abnormalities of other parts of the electric circuit, thus the switching efficiency of the main positive switch P2 and/or the main negative switch P3 in the electric circuit can be increased.

Figure 2:
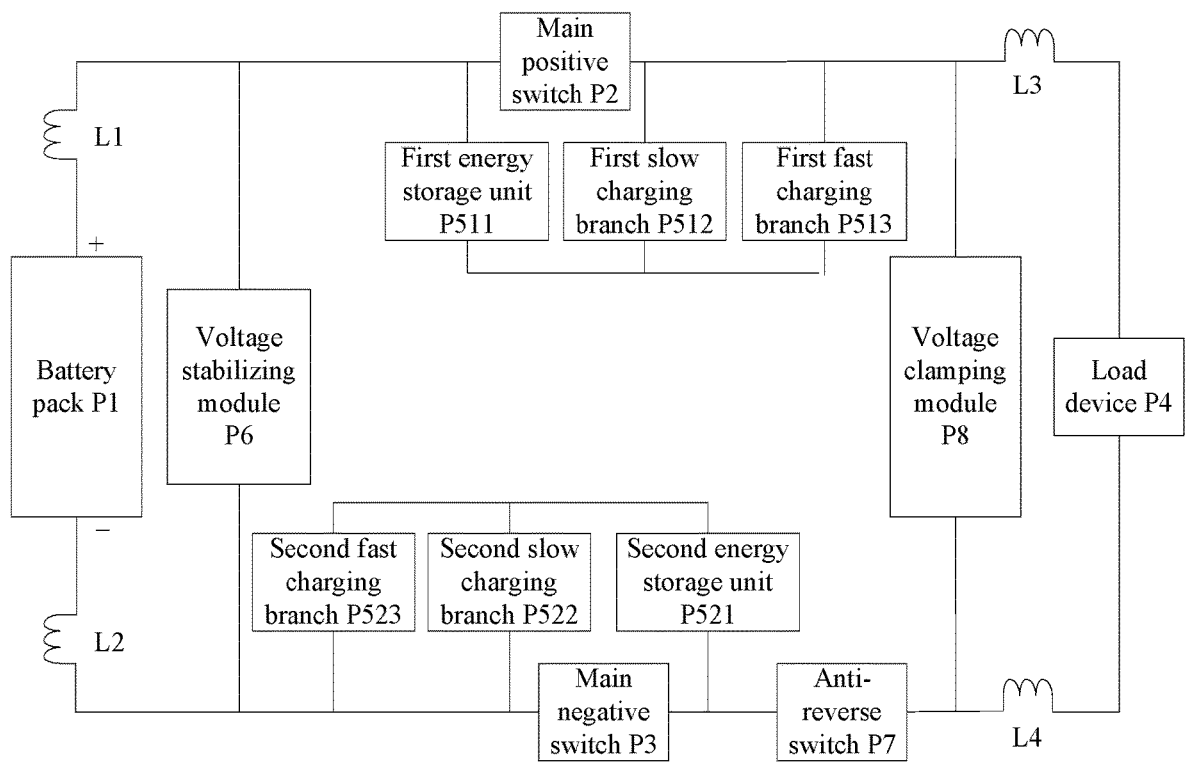
FIG. 2 is a structural diagram of an electric protection circuit according to another embodiment of the present application.

In another embodiment, the electric protection circuit electric protection circuit may also include an anti-reverse switch P7. For ease of illustration, exemplarily, the main positive switch P2, the main negative switch P3 and the anti-reverse switch P7 are all semiconductor switches, where the semiconductor switches are MOSFETs. FIG. 2 is a structural diagram of an electric protection circuit according to another embodiment of the present application. As shown in FIG. 2, on the basis of FIG. 1, the electric protection circuit may also include the anti-reverse switch P7, a voltage stabilizing module P6 and a voltage clamping module P8.

A first terminal of the anti-reverse switch P7 is connected to the first terminal of the main negative switch P3, and a second terminal of the anti-reverse switch P7 is connected to one terminal of load device P4. In a situation where the main negative switch is shared by the charging process and the discharging process in the electric protection circuit, the anti-reverse switch P7 may be used as the main negative control switch in the electric protection circuit during the charging process.

During the discharging process of the battery pack P1, the anti-reverse switch P7, the main negative switch P3 and the main positive switch P2 are all turned-on. If the circuit needs to be turned off in case of emergency, the anti-reverse switch P7 and the main positive switch P2 may be connected, and the control main negative switch P3 is turned off.

One terminal of the voltage stabilizing module P6 is connected to the first terminal of the main positive switch P2, and the other terminal of the voltage stabilizing module P6 is connected to the second terminal of the main negative switch P3. The voltage stabilizing module P6 is configured to stabilize an electric potential difference across the first terminal of the main positive switch P2 and the second terminal of the main negative switch P3. The voltage stabilizing module P6 has a function of storing electric energy, so that when the main positive switch P2 and/or the main negative switch P3 are turned off, the large current generated instantly is absorbed, thus stabilizing the electric potential difference across the first terminal of the main positive switch P2 and the second terminal of the main negative switch P3 within a standard range.

The voltage clamping module P8 is connected in parallel to the load device P4. The voltage clamping module P8 is configured to stabilize the voltage across the two terminals of the load device P4. If the induced electromotive force generated by the parasitic capacitance of the load device P4 causes the electric potential difference across the two terminals of the load device P4 to be overly large, the voltage clamping module P8 is configured to reduce the electric potential difference across the two terminals of the load device P4, so that the electric potential difference across the two terminals of the load device P4 is stable within a standard range.

As shown in FIG. 2, the first protection module p51 connected in parallel to the main positive switch P2 may specifically include the first energy storage unit P511, the first slow charging branch P512 and the first fast charging branch P513.

One terminal of the first energy storage unit P511 is connected to the first terminal of the main positive switch P2. The other terminal of the first energy storage unit P511 is connected to one terminal of the first slow charging branch P512 and one terminal of the first fast charging branch P513.

The first energy storage unit P511 is configured to store the electric energy across the two terminals of the main positive switch P2.

The other terminal of the first slow charging branch P512 is connected to the second terminal of the main positive switch P2. The first slow charging branch P512 is configured to transfer the electric energy across the two terminals of the main positive switch P2 to the first energy storage unit P511. The first slow charging branch P512 is further configured to transfer the electric energy released by the first energy storage unit P511 when the main positive switch P2 is turned on. That is, when the main positive switch P2 is turned on, the first energy storage unit P511 releases the electric energy through the first slow charging branch P512.

The other terminal of the first fast charging branch P513 is connected to the second terminal of the main positive switch P2. The first fast charging branch P513 is configured to: transfer the electric energy across the two terminals of the main positive switch P2 to the first energy storage unit P511, if the electric potential difference across the first terminal of the main positive switch P2 and the second terminal of the main positive switch P2 is higher than or equal to a potential difference threshold for enabling fast charging.

It should be noted that when the electric potential difference across the first terminal of the main positive switch P2 and the second terminal of the main positive switch P2 is lower than the potential difference threshold for enabling fast charging, the first slow charging branch P512 transfers the electric energy across the two terminals of the main positive switch P2 to the first energy storage unit P511. When the electric potential difference across the first terminal of the main positive switch P2 and the second terminal of the main positive switch P2 is higher than or equal to the potential difference threshold for enabling fast charging, the first slow charging branch P512 and the first fast charging branch P513 jointly transfer the electric energy across the two terminals of the main positive switch P2 to the first energy storage unit P511.

In some examples, a speed at which the first slow charging branch P512 transfers the electric energy across the two terminals of the main positive switch P2 to the first energy storage unit P511 is slower than a speed at which the first fast charging branch P513 transfers the electric energy across the two terminals of the main positive switch P2 to the first energy storage unit P511.

According to the electric potential difference across the first terminal and the second terminal of the main positive switch P2, the first slow charging branch P512 and the first fast charging branch P513 are turned on to transfer the electric energy across the two terminals of the main positive switch P2, and the electric potential difference across the two terminals of the main positive switch P2 is stabilized.

As shown in FIG. 2, the first protection module p51 connected in parallel to the main negative switch P3 may specifically include the second energy storage unit P521, the second slow charging branch P522 and the second fast charging branch P523.

One terminal of the second energy storage unit P521 is connected to the first terminal of the main negative switch P3. The other terminal of the second energy storage unit P521 is connected to one terminal of the second slow charging branch P522 and one terminal of the second fast charging branch P523. The second energy storage unit P521 is configured to store the electric energy across the two terminals of the main negative switch P3.

The other terminal of the second slow charging branch P522 is connected to the second terminal of the main negative switch P3. The second slow charging branch P522 is configured to transfer the electric energy across the two terminals of the main negative switch P3 to the second energy storage unit P521. The second slow charging branch P522 is further configured to transfer the electric energy released by the second energy storage unit P521 when the main negative switch P3 is turned on. When the main negative switch P3 is turned on, the second energy storage unit P521 releases the electric energy through the second slow charging branch P522.

The other terminal of the second fast charging branch P523 is connected to the second terminal of the main negative switch P3. The second fast charging branch P523 is configured to: transfer the electric energy across the two terminals of the main negative switch P3 to the second energy storage unit P521, if the electric potential difference across the first terminal of the main negative switch P3 and the second terminal of the main negative switch P3 is higher than or equal to the potential difference threshold for enabling fast charging.

It should be noted that when the electric potential difference across the first terminal of the main negative switch P3 and the second terminal of the main negative switch P3 is lower than the potential difference threshold for enabling fast charging, the second slow charging branch P522 transfers the electric energy across the two terminals of the main negative switch P3 to the second energy storage unit P521. When the electric potential difference across the first terminal of the main negative switch P3 and the second terminal of the main negative switch P3 is higher than or equal to the potential difference threshold for enabling fast charging, the second slow charging branch P522 and the second fast charging branch P523 jointly transfer the electric energy across the two terminals of the main negative switch P3 to the second energy storage unit P521.

In some examples, a speed of the second slow charging branch P522 transferring the electric energy across the two terminals of the main negative switch P3 to the second energy storage unit P521 is slower than a speed of the second fast charging branch P523 transferring the electric energy across the two terminals of the main negative switch P3 to the second energy storage unit P521.

According to the electric potential difference across the first terminal and the second terminal of the main negative switch P3, the second slow charging branch P522 and the second fast charging branch P523 are turned on to transfer the electric energy across the two terminals of the main negative switch P3, and the electric potential difference across the two terminals of the main negative switch P3 is stabilized.

Figure 3:
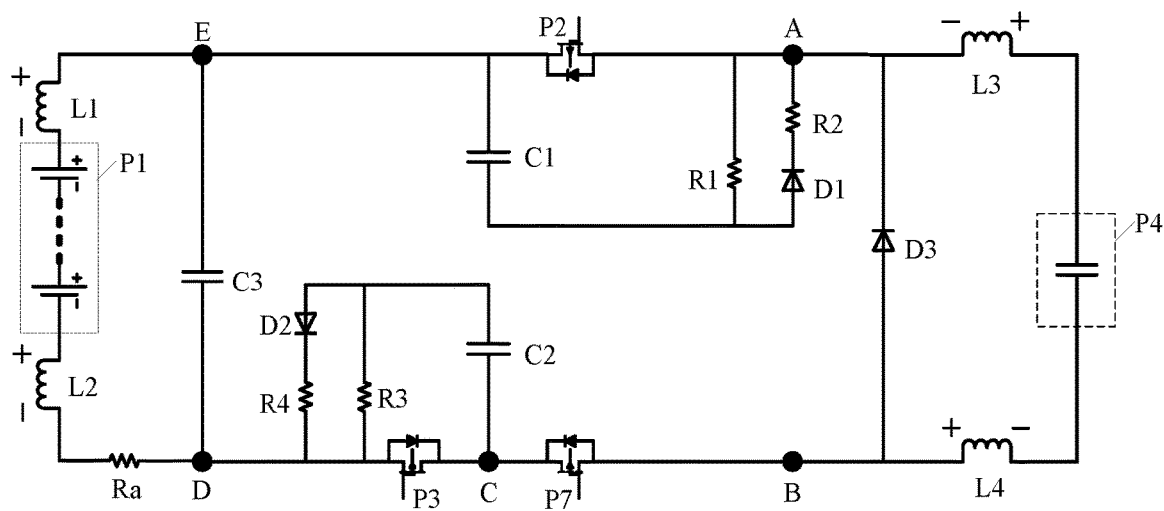
FIG. 3 is a structural diagram of an electric protection circuit according to yet another embodiment of the present application.

Exemplarily, the main positive switch P2, the main negative switch P3 and the anti-reverse switch P7 are all the main positive switch P2, and the main positive switch P2 is a MOSFET. FIG. 3 is a structural diagram of an electric protection circuit according to yet another embodiment of the present application. As shown in FIG. 3, the first energy storage unit P511 in the above embodiment includes a first capacitor C1. The first slow charging branch P512 includes a first resistor set R1. The first fast charging branch P513 includes a first diode D1 and a second resistor set R2. The second energy storage unit P521 includes a second capacitor C2. The second slow charging branch P512 includes a third resistor set R3. The second fast charging branch P523 includes a second diode D2 and a fourth resistor set R4. The voltage stabilizing module P6 includes a third capacitor C3. The voltage clamping module P8 includes a third diode D3. The load device P4 in FIG. 3 is represented as a load capacitor.

One terminal of the first capacitor C1 is connected to the first terminal of the main positive switch P2. The other terminal of the first capacitor C1 is connected to one terminal of the first slow charging branch P512 and one terminal of the first fast charging branch P513.

One terminal of the first resistor set R1 is connected to the other terminal of the first energy storage unit P511 and one terminal of the first fast charging branch P513. The other terminal of the first resistor set R1 is connected to the second terminal of the main positive switch P2. The first resistor set R1 as shown include at least one resistor.

An anode of the first diode D1 is connected to one terminal of the first resistor set R1 and the other terminal of the first energy storage unit P511. A cathode of the first diode D1 is connected to one terminal of the second resistor set R2. The other terminal of the second resistor set R2 is connected to the second terminal of the main positive switch P2 and the other terminal of the first resistor set R1. The second resistor set R2 as shown includes at least one resistor.

The second energy storage unit P521 in the above embodiment includes the first capacitor C1. The second slow charging branch P522 includes the third resistor set R3. The second fast charging branch P523 includes the second diode D2 and the fourth resistor set R4. The voltage stabilizing module P6 includes the second capacitor C2. The voltage clamping module P8 includes the second diode D2. The load device P4 in FIG. 3 is represented as a load capacitor.

One terminal of the first capacitor C1 is connected to the first terminal of the main negative switch P3. The other terminal of the first capacitor C1 is connected to one terminal of the second slow charging branch P522 and one terminal of the second fast charging branch P523.

One terminal of the third resistor set R3 is connected to the other terminal of the second energy storage unit P521 and one terminal of the second fast charging branch P523. The other terminal of the third resistor set R3 is connected to the second terminal of the main negative switch P3. The third resistor set R3 as shown includes at least one resistor.

An anode of the second diode D2 is connected to one terminal of the third resistor set R3 and the other terminal of the second energy storage unit P521. A cathode of the second diode D2 is connected to one terminal of the fourth resistor set R4. The other terminal of the fourth resistor set R4 is connected to the second terminal of the main negative switch P3 and the other terminal of the third resistor set R3. The fourth resistor set R4 as shown includes at least one resistor.

One terminal of the third capacitor C3 is connected to the first terminal of the main positive switch P2, and the other terminal of the third capacitor C3 is connected to the second terminal of the main negative switch P3.

The third diode D3 is connected in parallel to the load device P4, specifically, an anode of the third diode D3 is connected to one terminal of the load device P4, and a cathode of the third diode D3 is connected to the other terminal of the load device P4.

In the following, that the parasitic inductors in the electric protection circuit causes voltage rise between the two terminals of the semiconductor switch is taken as an example for illustration. If the main positive switch P2 is turned off, the current in the circuit of the electric protection circuit will decrease, and the parasitic inductors will each generate induced electromotive force opposite to the direction of the battery pack P1. The equivalent parasitic inductors in FIG.

3 include L1, L2, L3 and L4. The induced electromotive force of parasitic of the inductors L1, L2, L3 and L4 is denoted as E1, E2, E3 and E4 respectively. The "+" and "−" marked on the parasitic inductors L1, L2, L3 and L4 indicate the positive and negative electrode of the induced electromotive force respectively.

For ease of illustration, the first terminal of the main positive switch P2 is denoted as a point E, the second terminal of the main positive switch P2 is denoted as a point A, the connection point between the first terminal of the main negative switch P3 and the first terminal of the anti-reverse switch P7 is denoted as a point C, and the second terminal of the main negative switch P3 is denoted as a point D. The second terminal of the anti-reverse switch P7 is marked as a point B.

The voltage stored in the capacitor equivalent to the load device P4 is V_C_Load, the electric potential at the positive electrode of the battery pack P1 is V_PACK, and the induced electromotive force generated by the parasitic inductors L1, L2, L3 and L4 is E1, E2, E3 and E4, respectively. The direction of the induced electromotive force generated by the parasitic inductors L1, L2, L3, and L4 is opposite to the direction of the current when the battery pack P1 is discharged.

According to FIG. 3, if the main positive switch P2 is turned off, the electric potential at the point A is VA=V_C_Load−E4−E3−E2. The electric potential at the point E is VE=V_PACK+E1. If VE−VA is less than the forward conduction voltage VF1 of the first diode D1 in the first protection module p51, the first diode D1 in the first protection module p51 is cut off, and the first fast charging branch P513 in the first protection module p51 is cut off, that is, the first fast charging branch P513 in the first protection module p51 is not turned on. The first slow charging branch P512 in the first protection module p51 may be turned on. The first capacitor C1 in the first protection module P5 can be charged slowly through the first slow charging branch P512. If VE−VA is greater than or equal to the forward conduction voltage VF1 of the first diode D1, the first diode D1 in the first protection module p51 is turned on, the first fast charging branch P513 in the first protection module p51 is turned on, and the first slow charging branch P512 in the first protection module p51 is turned on. The first capacitor C1 in the first protection module p51 can be quickly charged through the first fast charging branch P513 and the first slow charging branch P512 in the first protection module p51. The fast charging here is a concept relative to the slow charging. The first capacitor C1 in the first protection module p51 is charged so that the electric potentials of the point A and point E tend to be the same.

In some examples, a total resistance value of the first resistor set R1 is greater than a total resistance of the second resistor set R2. A charging speed of the first capacitor C1 in the first protection module p51 through the first fast charging branch P513 is faster than a charging speed of the first capacitor C1 in the first protection module p51 through the first slow charging branch P512.

If the main positive switch P2 is turned off, the electric potential of the point A is VA=V_C_Load−E4−E3−E2. The electric potential of the point B is VB=−E2. If the electric potential difference across the point B and the point A VB−VA is greater than the forward conduction voltage VF3 of the third diode D3, the third diode D3 is turned on, which ensures that the electric potential difference across the point B and the point A is stable at VF3, avoiding that a large electric potential difference is generated across the point B and the point A.

If the main positive switch P2 is turned off and the main negative switch P3 is not turned off, the electric potential at the point C is equal to the electric potential at the point D, and the electric potentials at the two terminals of the main negative switch P3 do not change.

It should be noted that the first fast charging branch p53 corresponding to the main positive switch P2 includes the first diode D1. Due to the function of the first diode D1, the first fast charging branch P513 in the first protection module p51 is no longer turned on when the main positive switch P2 is turned on. Therefore, the first energy storage unit P511 in the first protection module p51 releases the electric energy through the first slow charging branch P512 in the first protection module p51.

Similarly, if the main negative switch P3 is turned off, the electric potential of the point B VB is equal to the electric potential of the point C VC, VB=VC=V_PACK+E1+E3−V_C_Load+E4. The electric potential at the point D is VD=−E2. If VC−VD is less than the forward conduction voltage VF2 of the second diode D2 in the second protection module P52, the second diode D2 in the second protection module P52 is cut off, and the second fast charging branch P523 in the second protection module P52 is cut off, that is, the second fast charging branch P523 in the second protection module P52 is not turned on. The second slow charging branch P522 in the second protection module P52 may be turned on. The second capacitor C2 in the second protection module P52 can be charged slowly through the second slow charging branch P522. If VC−VD is greater than or equal to the forward conduction voltage VF2 of the second diode D2 in the second protection module P52, the second diode D2 in the second protection module P52 is turned on, the second fast charging branch P523 in the second protection module P52 is turned on, and the second slow charging branch P522 in the second protection module P52 is turned on. The second capacitor C2 in the second protection module P52 can be quickly charged through the second fast charging branch P523 and the second slow charging branch P522 in the second protection module P52. The fast charging here is a concept relative to the slow charging. The second capacitor C2 in the second protection module P52 is charged so that the electric potentials at the point C and the point D tend to be the same.

In some examples, a total resistance value of the third resistor set R1 is greater than a total resistance value of the fourth resistor set R2. A charging speed of the second capacitor C2 in the second protection module P52 through the second fast charging branch P523 is faster than a charging speed of the second capacitor C2 in the second protection module P52 through the second slow charging branch P522.

If the main negative switch P3 is turned off, the electric potential at the point A is VA=V_PACK+E1. The electric potential at the point B is VB=V_PACK+E1+E3−V_C_Load+E4. If the electric potential difference across the point B and the point A VB−VA is greater than the forward conduction voltage VF3 of the third diode D3, the third diode D3 is turned on, which ensures that the potential difference across the point B and the point A is stable at VF3, avoiding that a large electric potential difference is generated across the point B and the point A.

If the main negative switch P3 is turned off and the main positive switch P2 is not turned off, the electric potential at the point A is equal to the electric potential at the point E, and the electric potentials at the two terminals of the main positive switch P2 do not change.

It should be noted that the second fast charging branch P523 includes a second diode D2. Due to the function of the second diode D2, the second fast charging branch P523 in the second protection module P52 is no longer turned on when the main positive switch P2 is turned on. Therefore, the second energy storage unit P521 in the second protection module P52 releases the electric energy through the second slow charging branch P522 in the second protection module P52.

It is worth mentioning that a shunt resistor Ra may also be set between the battery pack P1 and the main negative switch P3, which may be configured to sample the current in the circuit of the electric protection circuit. Specifically, one terminal of the shunt resistor Ra is connected to the negative electrode of the battery pack P1, and the other terminal of the shunt resistor RA is connected to the second terminal of the main negative switch P3.

Figure 4:
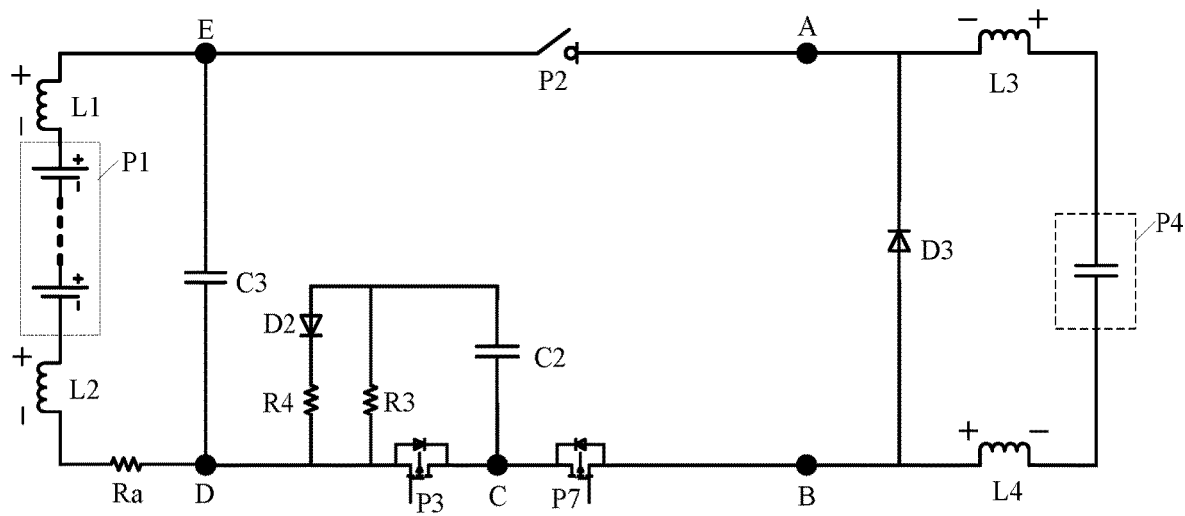
FIG. 4 is a structural diagram of an electric protection circuit according to yet another embodiment of the present application.

FIG. 4 is a structural diagram of an electric protection circuit according to another embodiment of the present application. The difference between FIG. 4 and FIG. 3 is that the main positive switch P2 is a relay. Then the main positive switch P2 does not need to be connected in parallel to the first protection module p51.

Although the switching frequency of the semiconductor switch is high, the heat loss caused by the conduction of the semiconductor switch is also high. Considering the switching frequency and heat loss, the main positive switch P2 may be set as a relay, so as to reduce the heat loss of the entire electric protection circuit. Moreover, because the cost of the relay is lower than that of the semiconductor switch, the cost of protection circuit can also be reduced.

The connection manner and the functions of other parts in FIG. 4 are the same as those in FIG. 3, which will not be repeated here.

Figure 5:
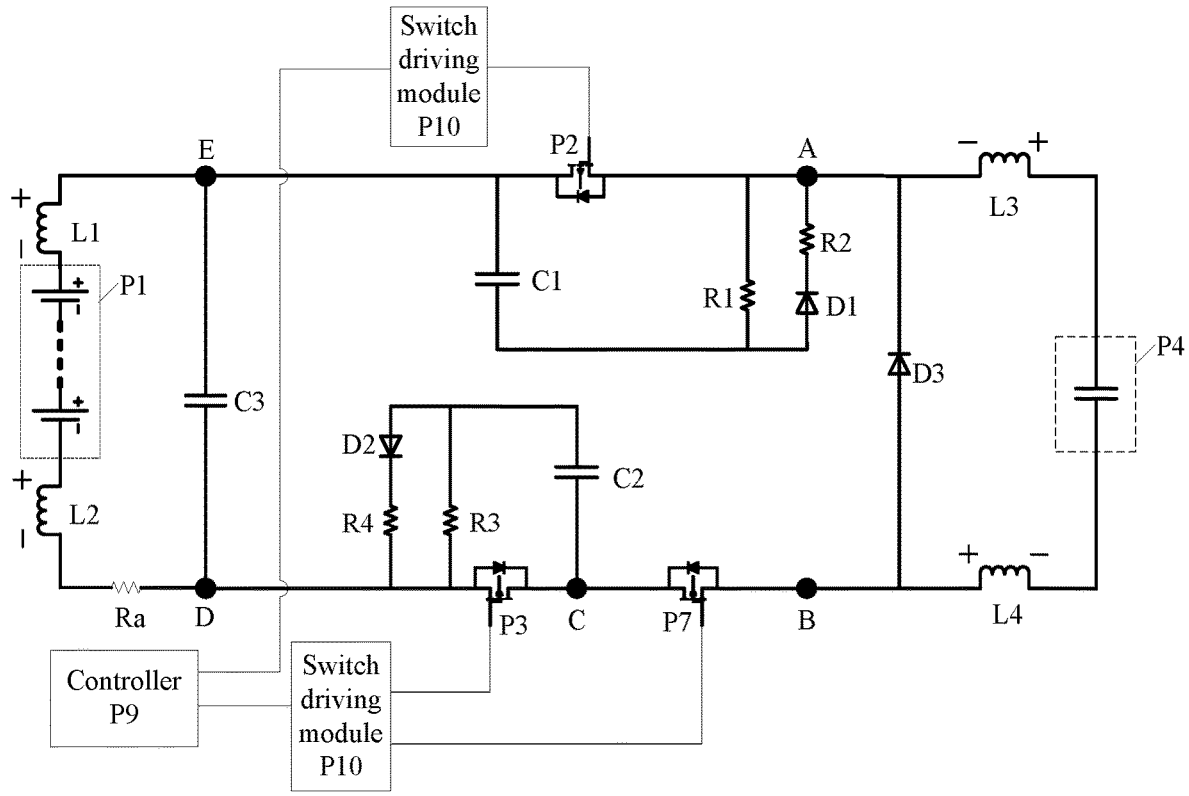
FIG. 5 is a structural diagram of the electric protection circuit according to yet another embodiment of the present application.

FIG. 5 is a structural diagram of the electric protection circuit according to another embodiment of the present application. The difference between FIG. 5 and FIG. 3 is that the electric protection circuit may further include a controller P9, a switch driving module P10 and a sensor. The controller P9 may be a micro controller unit (MCU) or the like.

The controller P9 is connected to the switch driving module P10. The switch driving module P10 is connected to main positive switch P2 and main negative switch P3. If the electric protection circuit includes the anti-reverse switch P7, the switch driving module P10 may also be connected to the anti-reverse switch P7. Specifically, the switch driving module P10 may be connected to the control terminal of the main positive switch P2, the control terminal of the main negative switch P3 and the control terminal of the anti-reverse switch P7. The number of the switch driving module P10 may be one or more. The switch driving module P10 may drive one switch or multiple switches, which will not be limited herein.

The controller P9 is configured to transmit a control instruction to the switch driving module P10.

The switch driving module P10 is configured to transmit driving signals to the main positive switch P2 and the main negative switch P3 according to the control instruction.

The driving signals include an ON signal or an OFF signal. The ON signal drives the switch to turn on. The OFF signal drives the switch to turn off.

The sensor may be connected to the controller P9. The sensor may be configured to collect a safety parameter and transmit the control instruction to the switch driving module P10 if the safety parameter exceeds the safety threshold range, and the control switch driving module P10 transmits the signal of turning off to the target switch.

In some examples, the above safety parameter includes one or more of: a voltage across the two terminals of the target switch, a temperature of the target switch, and a current flowing through the target switch. The target switch includes one or more of: the main positive switch P2, the main negative switch P3 and the anti-reverse switch P7.

For example, the safety parameters include the voltage across the two terminals of the target switch, the temperature of the target switch and the current flowing through the target switch. If at least one of the three safety parameters exceeds the safety threshold range corresponding to that safety parameter, the control instruction is transmitted to the switch driving module, and the control switch driving module transmits the signal of turning off to the target switch, so as to turn off the target switch, which avoids the damage of the electric protection circuit, and improves the safety of the electric protection circuit.

It should be noted that in the above embodiment, if the switch is a semiconductor switch, and the semiconductor switch is a MOSFET or an IGBT. Then the first terminal of the semiconductor switch is the drain electrode, the second terminal of the semiconductor switch is the source electrode, and the control terminal of the semiconductor switch is the gate electrode. However, the scheme of changing the type of semiconductor switch and adjusting the direction of semiconductor switch according to the embodiments of the present application also falls into the protection scope of the embodiments of the present application.

It should be clear that the respective embodiments in the specification are described in a progressive way, and the same or similar parts of each embodiment can be referred to each other. Each embodiment focuses on the differences with other embodiments. The present application is not limited to the specific structures described above and shown in the drawings. Those skilled in the art can make various changes, modifications and additions after understanding the spirit of the present application.

Those skilled in the art should understand that the above-mentioned embodiments are all exemplary instead of restrictive. Different technical features appearing in different embodiments can be combined to obtain beneficial effects. Those skilled in the art should be able to understand and implement other modified embodiments of the disclosed embodiments on the basis of studying the drawings, the description, and the claims. In the claims, the term "comprising" does not exclude other devices or steps; the indefinite article "a" does not exclude a plurality; the terms "first" and "second" are used to indicate names and not to indicate any particular order. Any reference signs in the claims should not be construed as limiting the scope of protection. The functions of several parts appearing in the claims can be realized by a single hardware or software module. The presence of certain technical features in different dependent claims does not mean that these technical features cannot be combined to obtain beneficial effects.

What is claimed is:

1. An electric protection circuit, comprising:
a battery pack, a main positive switch, a load device and a main negative switch connected in series, wherein
the main positive switch and/or the main negative switch comprise at least one semiconductor switch; and
the main positive switch and/or the main negative switch in the electric protection circuit are connected in parallel to a protection module, wherein the protection module is configured to absorb electric energy across two terminals of the main positive switch and/or the main negative switch when the main positive switch and/or the main negative switch are turned off; and the protection module comprises a first protection module connected in parallel to the main positive switch, and the first protection module comprises:

a first energy storage unit, wherein one terminal of the first energy storage unit is connected to a first terminal of the main positive switch, the other terminal of the first energy storage unit is connected to one terminal of a first slow charging branch and one terminal of a first fast charging branch, and the first energy storage unit is configured to store the electric energy across the two terminals of the main positive switch;

the first slow charging branch, the other terminal of the first slow charging branch is connected to a second terminal of the main positive switch, the first slow charging branch is configured to transmit the electric energy across the two terminals of the main positive switch to the first energy storage unit, and transmit electric energy released by the first energy storage unit when the main positive switch is turned on; and the first fast charging branch, wherein the other terminal of the first fast charging branch is connected to the second terminal of the main positive switch, and the first fast charging branch is configured to transmit the electric energy across the two terminals of the main positive switch to the first energy storage unit, when an electric potential difference across the first terminal of the main positive switch and the second terminal of the main positive switch is higher than or equal to a first potential difference threshold for enabling fast charging.

2. The electric protection circuit according to claim 1, wherein the energy storage unit comprises a first capacitor, wherein one terminal of the first capacitor is connected to the first terminal of the main positive switch, the other terminal of the first capacitor is connected to one terminal of the first slow charging branch and one terminal of the first fast charging branch.

3. The electric protection circuit according to claim 1, wherein the slow charging branch comprises a first resistor set, and the first resistor set comprises at least one resistor, one terminal of the first resistor set is connected to the other terminal of the first energy storage unit and one terminal of the first fast charging branch, and the other terminal of the first resistor set is connected to the second terminal of the main positive switch.

4. The electric protection circuit according to claim 3, wherein the first fast charging branch comprises a first diode and a second resistor set, and the second resistor set comprises at least one resistor, an anode of the first diode is connected to one terminal of the first resistor set and the other terminal of the first energy storage unit, a cathode of the first diode is connected to one terminal of the second resistor set, the other terminal of the second resistor set is connected to the second terminal of the main positive switch and the other terminal of the first resistor set.

5. The electric protection circuit according to claim 4, wherein a total resistance value of the first resistor set is greater than a total resistance value of the second resistor set.

6. The electric protection circuit according to claim 1, wherein the protection module comprises a second protection module connected in parallel to the main negative switch, and the second protection module comprises:

a second energy storage unit, wherein one terminal of the second energy storage unit is connected to the first terminal of the main negative switch, the other terminal of the second energy storage unit is connected to one terminal of a second slow charging branch and one terminal of a second fast charging branch, and the second energy storage unit is configured to store the electric energy across the two terminals of the main negative switch;

the second slow charging branch, wherein the other terminal of the second slow charging branch is connected to the second terminal of the main negative switch, the second slow charging branch is configured to transmit the electric energy across the two terminals of the main negative switch to the second energy storage unit, and to transmit electric energy released by the second energy storage unit when the main negative switch is turned on;

the second fast charging branch, wherein the other terminal of the second fast charging branch is connected to the second terminal of the main negative switch, and the second fast charging branch is configured to transmit the electric energy across the two terminals of the main negative switch to the second energy storage unit, when an electric potential difference across the first terminal of the main negative switch and the second terminal of the main negative switch is higher than or equal to a second potential difference threshold for enabling fast charging.

7. The electric protection circuit according to claim 6, wherein the energy storage unit comprises a second capacitor, wherein one terminal the second capacitor is connected to the first terminal of the main negative switch, the other terminal of the second capacitor is connected to one terminal of the second slow charging branch and one terminal of the second fast charging branch.

8. The electric protection circuit according to claim 6, wherein the slow charging branch comprises a third resistor set, and the third resistor set comprises at least one resistor, one terminal of the third resistor set is connected to the other terminal of the second energy storage unit and one terminal of the second fast charging branch, and the other terminal of the third resistor set is connected to the second terminal of the main negative switch.

9. The electric protection circuit according to claim 8, wherein the first fast charging branch comprises a second diode and a fourth resistor set, and the fourth resistor set comprises at least one resistor, an anode of the second diode is connected to one terminal of the third resistor set and the other terminal of the second energy storage unit, a cathode of the second diode is connected to one terminal of the fourth resistor set, and the other terminal of the fourth resistor set is connected to the second terminal of the main negative switch and the other terminal of the third resistor set.

10. The electric protection circuit according to claim 9, wherein a total resistance value of the third resistor set is greater than a total resistance value of the fourth resistor set.

11. The electric protection circuit according to claim 1, wherein the electric protection circuit further comprises a voltage stabilizing module, wherein one terminal of the voltage stabilizing module is connected to the first terminal of the main positive switch, the other terminal of the voltage stabilizing module is connected to the second terminal of the main negative switch, and the voltage stabilizing module is configured to stabilize an electric potential difference across the first terminal of the main positive switch and the second terminal of the main negative switch.

12. The electric protection circuit according to claim 11, wherein the voltage stabilizing module comprises a third capacitor, and one terminal of the third capacitor is connected to the first terminal of the main positive switch, and the other terminal of the third capacitor is connected with to second terminal of the main negative switch.

13. The electric protection circuit according to claim 1, wherein the electric protection circuit further comprises a voltage clamping module connected in parallel to the load device, and the voltage clamping module is configured to stabilize a voltage across two terminals of the load device.

14. The electric protection circuit according to claim 13, wherein the voltage clamping module comprises a third diode, wherein an anode of the third diode is connected to one terminal of the load device, and a cathode of the third diode is connected to the other terminal of the load device.

15. The electric protection circuit according to claim 1, wherein the electric protection circuit further comprises an anti-reverse switch, wherein a first terminal of the anti-reverse switch is connected to the first terminal of the main negative switch, and a second terminal of the anti-reverse switch is connected to one terminal of the load device.

16. The electric protection circuit according to claim 15, wherein the anti-reverse switch is a semiconductor switch.

17. The electric protection circuit according to claim 1, wherein the main positive switch, and the main negative switch are both semiconductor switches; or the main positive switch is a relay, and the main negative switch is a semiconductor switch.

18. The electric protection circuit according to claim 1, wherein the electric protection circuit further comprises a controller and a switch driving module, wherein the controller is connected to the switch driving module, the switch driving module is connected to the main positive switch and the main negative switch, the controller is configured to transmit a control instruction to the switch driving module; and the switch driving module is configured to transmit driving signals to the main positive switch and the main negative switch according to the control instruction, wherein the driving signals comprise an ON signal or an OFF signal.

19. The electric protection circuit according to claim 18, wherein the electric protection circuit further comprises a sensor connected to the controller, the sensor is configured to collect a safety parameter, wherein the safety parameter comprises one or more of: a voltage across two terminals of a target switch, a temperature of the target switch, and a current flowing through the target switch, wherein the target switch comprises one or more of: the main positive switch, the main negative switch, and the anti-reverse switch;

the controller is further configured to transmit a control instruction to the switch driving module to control the switch driving module to transmit an OFF signal to the target switch, when the safety parameter exceeds a safety threshold range.

* * * * *